United States Patent [19]
Bertolasi

[11] 3,944,288
[45] Mar. 16, 1976

[54] SKID CONTROL SYSTEM FOR TWO-WHEELED VEHICLES

[75] Inventor: Robert B. Bertolasi, Rockford, Ill.

[73] Assignee: Kelsey-Hayes Company, Romulus, Mich.

[22] Filed: Feb. 4, 1974

[21] Appl. No.: 439,296

[52] U.S. Cl. .......................... 303/21 AF; 340/52 B
[51] Int. Cl.² .......................................... B60T 8/10
[58] Field of Search ...... 188/181 C; 303/20, 21 AF, 303/21 BE; 307/10 R; 317/27 R, 31, 60 A; 324/51; 340/52 R, 52 B, 248 A, 253 B

[56] References Cited
UNITED STATES PATENTS

| | | | |
|---|---|---|---|
| 3,245,213 | 4/1966 | Thompson et al. | 188/181 C |
| 3,608,979 | 9/1971 | Coyle | 303/20 X |
| 3,650,574 | 3/1972 | Okamoto et al. | 3030/21 AF |
| 3,680,923 | 8/1972 | Peterson et al. | 303/21 AF |
| 3,759,582 | 9/1973 | Ohta et al. | 303/21 AF |
| 3,822,921 | 7/1974 | Jones | 303/21 AF X |

Primary Examiner—Trygve M. Blix
Assistant Examiner—Stephen G. Kunin
Attorney, Agent, or Firm—Gaylord P. Haas, Jr.

[57] ABSTRACT

A skid control system for use in connection with controlling the application of the brakes on a two-wheeled vehicle which includes a sensor device for sensing the velocity of wheel rotation, a triple integration circuit connected to the sensor for producing an analog signal which is proportional to the wheel velocity and a proportioning circuit connected to the triple integration circuit. The output of the proportioning circuit is fed to a hysteresis and low speed cut-off circuit, and a ramp generator circuit, the outputs of the two above noted circuits being fed to the input of a comparator circuit which compares the wheel velocity with a simulated vehicle velocity signal generated by the ramp generator circuit. The output of the comparator is utilized to control a brake application valve associated with the brake system. The brake control system also includes a plurality of fail-safe systems which continuously monitor various other circuits within the brake control system and produces an output signal when a fault condition is sensed.

11 Claims, 4 Drawing Figures

Fig. 4.

SKID CONTROL SYSTEM FOR TWO-WHEELED VEHICLES

BACKGROUND AND SUMMARY OF THE DISCLOSURE

This invention relates generally to a skid control system and more particularly to an improved skid control system which is particularly adapted to be utilized in conjunction with controlling the brakes of a two-wheeled vehicle.

The possible dangers involved in riding a motorcycle are varied and well known. One of the more critical areas of concern in the use of a motorcycle and an operation of the vehicle with which a great number of injuries are associated involves the use of the braking system wherein the front or rear wheel or both wheels lock up during the braking operation. The resultant lock-up of the front and/or rear wheel of the motorcycle causes a loss of control of the vehicle due to the fact that the rotation of the wheel is important in maintaining directional stability of the vehicle and also the skidding of the wheel additionally causes a loss of directional control. Accordingly, it is highly desirable to include a reliable skid control system with motorcycle vehicles to preclude injuries resulting from skidding wheels during the braking operation.

Skid control systems for motorcycle vehicles have been proposed in the past but have involved certain defects. For example, a vacuum-actuated system has been proposed which is not totally reliable in operation due to the fact that the engines associated with motorcycle vehicles do not produce enough vacuum to properly actuate the system. Further, with a two cycle engine, the vacuum utilized in actuating the skid control system is shared with the fuel system of the vehicle. As is known, vacuum systems require large units for vacuum storage and the large springs required for operation take up a great deal of room. Additionally, the prior art systems have been found to operate poorly when the vehicle is being stopped on wet surfaces. It is the alleviation of these problems which the system of the present invention has been evolved.

With the system of the present invention, the system is capable of operating at extremely low speeds due to the fact that the system is adapted to be utilized with a hydraulic modulator unit which will develop suitable pressures at idle speed. Such a modulator unit is disclosed in the copending application of Thomas M. Atkins, Ser. No. 391,463, filed Aug. 24, 1973. Further, the system incorporates a triple integration circuit at the input section thereof wherein the tachometer pulses from the wheel speed sensor are integrated three times to provide a highly reliable vehicle wheel speed signal at low speeds. The system also includes an extremely low speed cut-off circuit which renders the system inoperative at speeds below a certain amount where the wheel speed signal may be unreliable.

The system further includes several circuit monitoring systems which provide a means for shutting down the skid control system in the event of a failure of any part of the skid control system. For example, the system includes a short or open sensor detector, which circuit is utilized to sense the sensor input to determine if a short or open has occurred at the wheel speed sensor. If this condition exists, the power supply circuit is shut down to preclude further operation of the skid control system. Further, the fail-safe system checks to determine the length of time the skid control module is providing an output and also checks if no output is provided when the module should have an output. Under these conditions, the system is again shut down if the condition persists. Further, the system determines if an unwanted output is provided by the skid control module when no output is required. In this case, the system is again shut down by disabling the power supply.

Accordingly, it is one object of the present invention to provide an improved skid control system.

It is another object of the present invention to provide an improved skid control system for use in conjunction with two-wheeled vehicles such as motorcycles.

It is another object of the present invention to provide an improved highly reliable tachometer circuit for use in conjunction with motorcycle skid control systems to provide an input wheel speed signal to the skid control module.

It is still another object of the present invention to provide an improved fail-safe monitoring system for continuously checking the operation of the skid control circuit to provide fail-safe operation of the skid control system.

It is a further object of the present invention to provide an improved short or open detector for the wheel speed sensor circuit for use in conjunction with two-wheeled vehicle skid control systems.

It is still a further object of the present invention to provide a self-check circuit for a vehicle speed ramp generator circuit utilized in conjunction with two-wheeled vehicle skid control systems.

It is still another object of the present invention to provide an excessive output fail-safe circuit and a no output fail-safe circuit for use in conjunction with skid control systems associated with two-wheeled vehicles.

It is a further object of the present invention to provide an improved hysteresis and temperature compensation circuit for use in conjunction with two-wheeled skid control systems.

It is still a further object of the present invention to provide an improved fail-safe circuit for monitoring the module response output circuit to determine if an unwanted output is provided to the valve in a braking system.

It is still another object of the present invention to provide an improved fail-safe circuit for detecting faults in the driver, time delay and regulator systems incorporated in skid control systems for a two-wheeled vehicle.

Further objects, features and advantages of this invention will become apparent from a consideration of the following description, the appended claims and the accompanying drawings in which:

FIG. 3 is another schematic diagram illustrating another portion of the block diagram of FIG. 1 and particularly illustrating the details of the amplifier and proportioning circuit, the temperature equivalent, hysteresis and low speed cut-off circuit, the ramp control circuit, the comparator circuit and the output driver circuit.

Figures 1, 2:
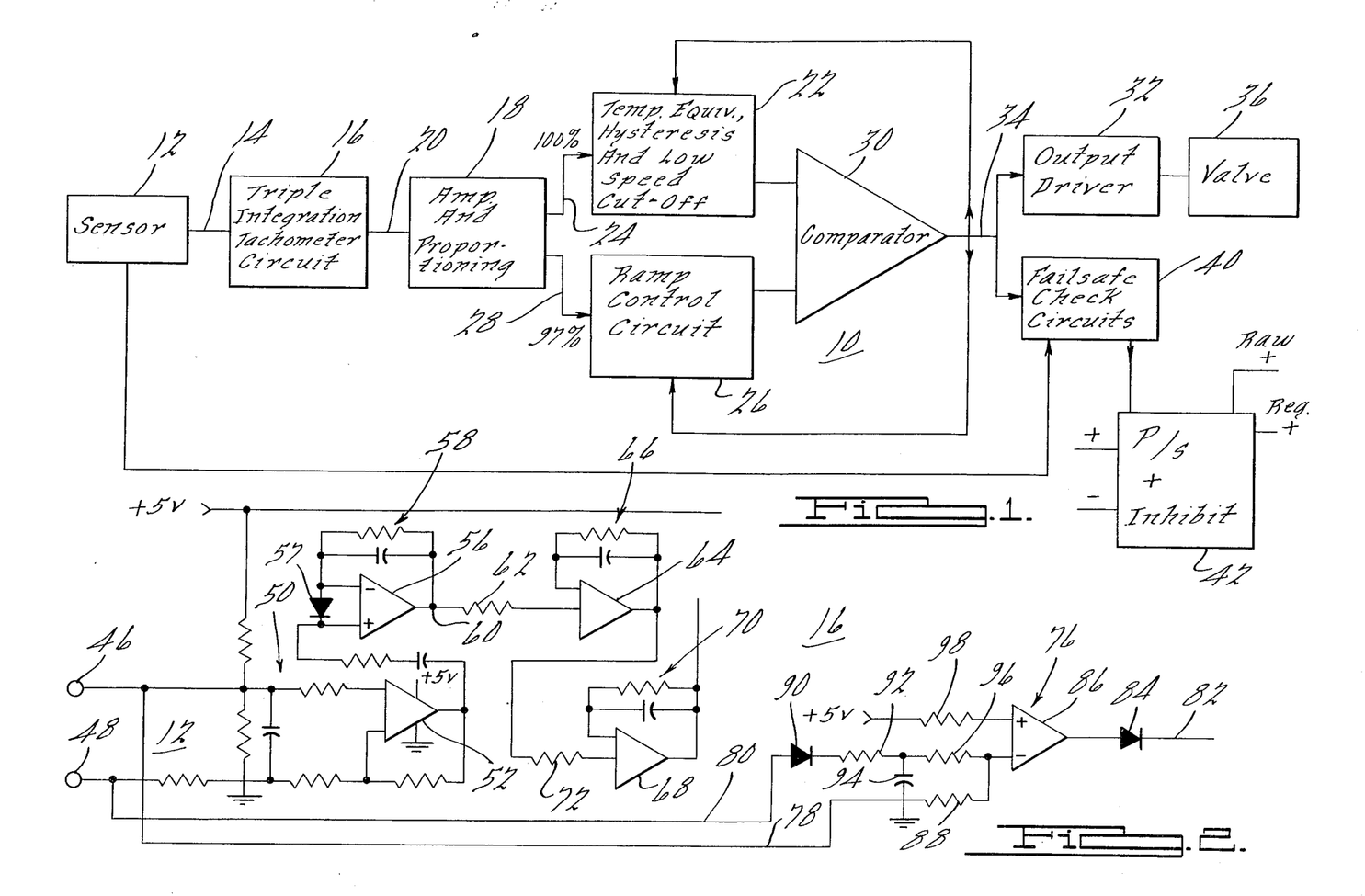
FIG. 1 is a block diagram illustrating certain features of the present invention.
FIG. 2 is a schematic diagram illustrating a portion of the block diagram of FIG. 1 and particularly illustrating the triple integrator tachometer circuit.
Figure 2:
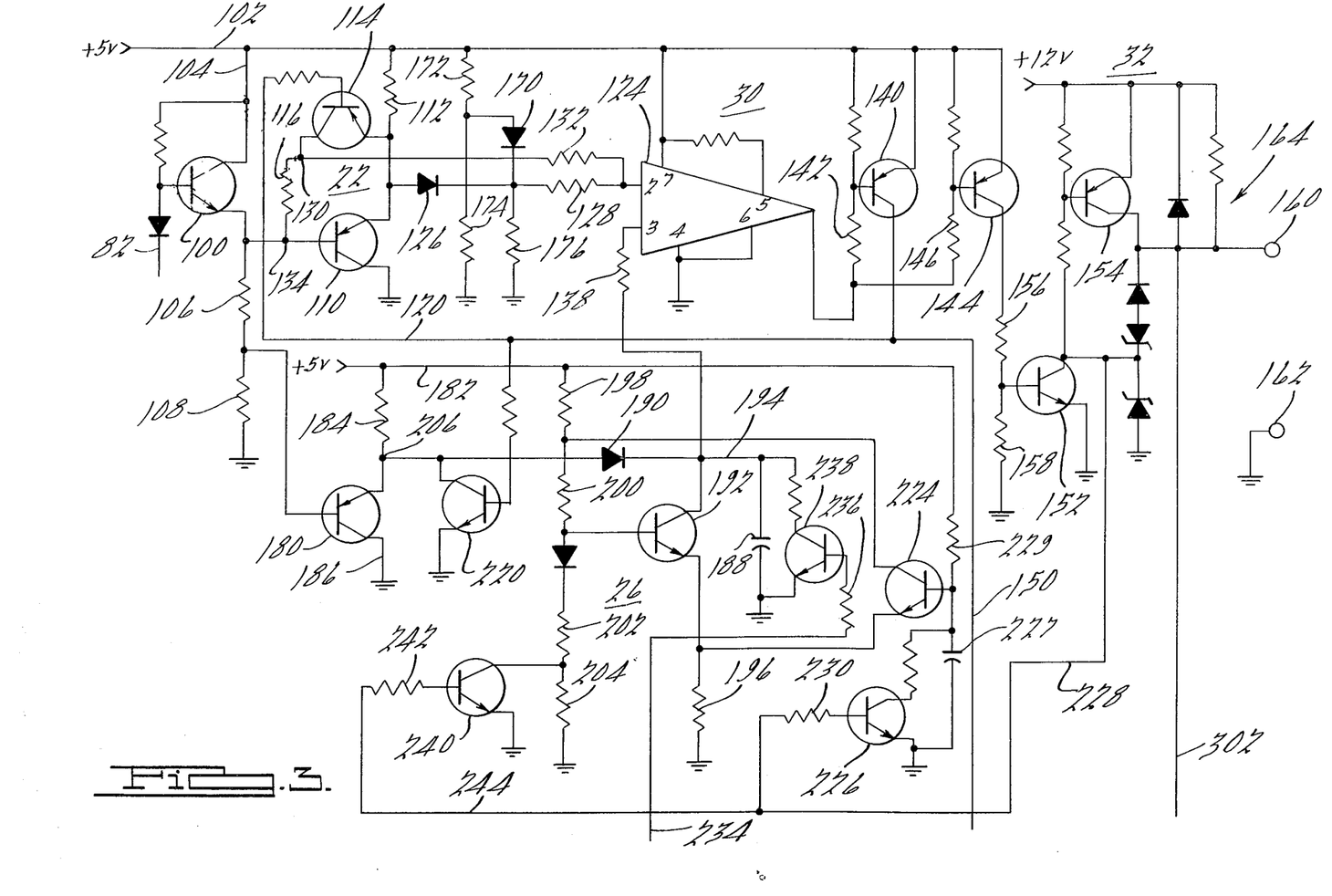

Referring now to FIG. 1, there is shown a block diagram 10 illustrating the features of the present invention. Particularly, the input section is provided with a wheel velocity sensor circuit 12, the circuit 12 taking the form of a pulse generator associated with the wheel of the vehicle. As the motorcycle wheel revolves, a plurality of output pulses are provided on conductor 14, the frequency of the pulses varying as a direct function of the speed of rotation of the wheel.

The signal generated by the sensor is fed to a triple integration tachometer circuit 16, which circuit includes a frequency doubler and three stages of integration to provide a high response rate at low speed while still minimizing output ripple. As will be seen from a discussion of details of the integration circuit, a quad operational amplifier has been utilized to provide the frequency doubling and triple integration function.

The output of the triple integration tachometer circuit 16 is fed to an amplifier and proportioning circuit 18 by means of a conductor 20. The amplifier circuit includes a transistor to amplify the output signal from the integration circuit 16 and also the circuit 18 includes a voltage divider circuit which is utlizied to proportion the output signals being fed to the hysteresis and low speed cut-off circuit 22 by means of a conductor 24 and to the ramp control circuit 26 by means of a conductor 28. As is seen from FIG. 1, the signal being fed to the hysteresis and low speed cut-off circuit 22 is 100 percent of the output signal from the amplifer and proportioning circuit 18 while the ramp control circuit receives 97 percent of the output signal from the amplifier and proportioning circuit 18. In this way the ramp control circuit generates a ramp which starts at a level slightly less than the synchronous speed of the vehicle wheel.

The output from the hysteresis and low speed cut-off circuit 22 and the ramp control circuit 26 are fed to the input circuit of a comparator circuit 30, the comparator circuit comparing the analog signal representing the wheel speed generated by the circuit 22 and the simulated vehicle speed as generated by the ramp control circuit 26. The comparator circuit 30, when a preselected relationship exists between the wheel speed and the vehicle speed, provides an output signal from the comparator to an output driver circuit 32 by means of a conductor 34. The output driver circuit is connected in controlling relation with the valve 36 associated with a hydraulic brake modulator suitable for vehicles of this type.

The circuit of FIG. 1 also contains fail-safe check circuits 40 which are utilized to sense the operation of the various modules within the system 10, and particularly the operation of the output of the comparator and the operation of the sensor 12. As will be seen from a description of the circuitry to be described in conjunction with FIG. 4, the fail-safe check circuits include a circuit for checking when the output driver circuit 32 has provided an output signal for an excessive length of time or has not provided an output when an output is required. Further, the fail-safe check circuit 40 contains a system for determining when an unwanted output has been generated by the system, the unwanted output typically being a module signal developed at the output but not at the comparator. Further, the fail-safe check circuit includes a sensor failure detector which will sense whether the wheel speed sensor is open or shorted and also provides a means for monitoring whether the driver, time delay or regulator is operating improperly. Upon determining that a fault has occurred, the fail-safe check circuit includes means for providing an output to the power supply to inhibit the operation of the power supply and thus shut down the operation of the skid control system.

Referring now to FIG. 2, there is illustrated the specific circuit details of the triple integration tachometer circuit. Specifically, a pair of input terminals 46, 48 are connected across the wheel speed sensor, the wheel speed sensor producing a plurality of pulses at the input terminals 46, 48 in response to the turning of the motorcycle wheel. The frequency of these pulses is directly proportional to the speed of the wheel. The pulses are fed through an RC network 50 to an operation amplifier 52, which amplifier 52 provides output pulses having a frequency which is equal to the frequency of the pulses at input terminals 46, 48. However, the pulses have been squared to provide sharp rises and drops in the amplitude of the pulses.

The output of amplifier 52 is fed to a first integrator operational amplifier 65, which operational amplifier is also connected to provide a frequency doubling effect due to the circuit arrangement selected for the resistive-capacitive feedback network 58 and diode 57. The frequency doubling effect is produced by generating an output current at the output node 60 which is twice the output current which would be produced for a given frequency output from the operational amplifier 52 if the operational amplifier 56 were not of the frequency doubling type. It is to be understood that the term frequency doubling in this sense does not actually mean that the frequency of the output circuit at the output node 60 as this output is an analog output rather than a series of pulses due to the integrating capabilities of the operational amplifier 56.

The output of operational amplifier 56 is fed to a second integrating operational amplifier 64 by means of a resistor 62, the operational amplifier 64 also including a resistive-capacitive feedback network 66 which provides a straight integration function of the input from resistor 62. The operational amplifier 64 provides a second integration of the signal from operational amplifier 52. The third integration of the wheel speed signal is provided by an operational amplifier 68, which includes a resistive-capacitive network 70, the signal from operational amplifier 64 being fed to the third integrator operational amplifier 68 by means of a resistor 72.

Thus, the input signal from terminals 46, 48 is amplified and squared by means of the network 50 and operational amplifier 52. Subsequently, the signal from operational amplifier 52 is integrated three times by means of operational amplifiers 56, 64 and 68, the amplifier 56 also providing a doubling effect at its output.

The circuit of FIG. 2 also includes a sensing system 76 which is connected to the terminals 46, 48 by means of a pair of conductors 78, 80. The sensing system 76 is utilized to sense when the sensor input connected to terminals 46, 48 is either shorted or open circuited due to a failure in the sensor itself. The failure described above switches the circuit 76 from the non-conductive to the conductive state to produce an output signal at an output conductor 82 through a diode 84. This output conductor is interconnected with FIG. 4 as will be described hereinafter.

The sensing circuit includes an operational amplifier 86 which is fed an input signal from conductor 78 through a resistor 88. On the other hand, the conductor 80 is connected to the same input terminal of operational amplifier 86 through a diode 90, a resistor 92, a parallel capacitor 94 and a resistor 96. The positive input of the operational amplifier 86 is tied to a positive 5 volt potential through a resistor 98.

The operational amplifier input circuit is connected so that there is required to be a certain current flow on conductors 78 and 80 to maintain operational amplifier 86 in the non-conductive state. If current in either conductor 78 or 80 is discontinued, then the operational amplifier 86 will commence conduction to provide an output signal at conductor 82.

Accordingly, if the sensor is open circuited, either one of the conductors 78 or 80 will be disconnected from the input circuit of operational amplifier 86. On the other hand, if the sensor is short circuited, there will be no current flow in either conductors 78 or 80. Thus, with the loss of either one or both currents flowing in conductors 78 and 80, the operational amplifier 86 will commence conduction to provide an output signal at output conductor 82.

Referring now to FIG. 3, there is illustrated the wheel amplifier driver and hysteresis circuit 22, the comparator and intermodule output circuit 30, the output driver amplifier circuit 32 and the ramp generator and self-check control circuit 26. The circuits of FIG. 3, which are the details of the block diagram illustrated in FIG. 1 to the extent indicated, is provided with the corresponding reference numerals from the block diagram of FIG. 1 so that the circuit diagram of FIG. 3 may be correlated with FIG. 1.

Referring now to the specific details of FIG. 3, the signal on input conductor 82 is fed to an NPN transistor 100, and particularly to the base electrode thereof, the collector electrode being connected to a source of 5 volt potential at conductor 102 by means of a conductor 104 and the emitter electrode thereof being connected to ground through a voltage divider resistor combination, including resistors 106, 108. As was described above, the signal from the triple integrator is fed to the hysteresis circuit 22 at a 100 percent value thereof and the wheel speed signal is fed to the ramp control circuit 26 at a reduced value of 97 percent. Accordingly, the resistor 106 bears a relation to resistor 108 such that 3 percent of the wheel speed signal is dropped across resistor 106 and 97 percent of the wheel speed signal is dropped across resistor 108.

The wheel speed signal at the emitter electrode of transistor 100 is fed to the base electrode of a PNP transistor 110, the signal being fed to transistor 110 being the entire wheel speed signal.

The transistor 110 includes an emitter electrode connected to the source of five volt potential at conductor 102 through a resistor 112 under certain circumstances and may be connected to the base electrode of the transistor 110 through the emitter-collector electrodes of a transistor 114 through a resistor 116 under certain other circumstances. The transistor 114 is rendered responsive to the output of the comparator stage 30 by means of a conductor 120 as will be more fully explained hereinafter. The transistor 114 creates the hysteresis effect to be described.

The emitter electrode of transistor 110 is connected to the input circuit of a comparator operational amplifier 124 through a didoe 126 and a resistor 128. The comparator 124 also includes a second input from a node 130, the voltage at node 130 being fed thereto by means of a resistor 132. The voltage at node 130 may be the voltage being fed to the base electrode of transistor 110 at node 134 as fed thereto by means of resistor 116 or may be the emitter voltage of transistor 110 as exists at the lower end of resistor 112, as fed thereto by means of the emitter-collector circuit of transistor 114. The current flowing in resistor 132 influences the turn-on and turn-off point of the comparator 124 so that the hysteresis effect may be created to insure that the comparator 124 will not oscillate at a particular point.

Thus, the wheel speed signal is fed to the comparator by means of the combined currents flowing through resistors 128 and 132 and a ramp signal is fed to the comparator 124 by means of a resistor 138 which is connected to the ramp generator circuit 26. The details of the ramp generator circuit 26 will be described more fully hereinafter.

The output of comparator circuit 124 is normally at a high level and drops to a low level when it is desired to relieve the brakes. This signal is fed to the input circuit of a current driver transistor 140 by means of a resistor 142 and to a second current driver transistor 144 by means of a resistor 146. The output of transistor 140 is fed to the fail-safe circuit to be described in conjunction with FIG. 4 by means of a conductor 150 and the output of transistor 144 is fed to a pair of output driver amplifiers 152, 154 by means of a pair of voltage divider resistors 156, 158. The output of the driver amplifier 154 is fed to a pair of valve output terminals 160, 162 to drive the brake control module. When the module is turned on, the output signal rises from a low level to a high level to relieve the brake pressure. Suitable safety diodes 164 have been provided to absorb any transients generated at the output circuit 32.

Referring now to the feedback loop, the collector of transistor 140 is connected to the base electrode of transistor 114 through the conductor 120. The transistor 140 is normally non-conductive and becomes conductive when it is desired to relieve the brake and turn the module on. The transistor 114 is normally conductive and becomes non-conductive when the module is turned on and the brakes are relieved. Accordingly, with the transistor 114 normally conductive, the resistor 132 is connected to the lower end of resistor 112 through the emitter-collector electrodes of transistor 114. When the transistor 140 becomes conductive (the module is turned on) the transistor 114 is rendered non-conductive and the node 130 is connected to the node 134 through the resistor 116. Thus, the hysteresis effect for the comparator 124 is created, the transistor 114 turning on and off in response to the conductive condition of transistor 140, which, in turn, is rendered responsive to the conductive condition of comparator circuit 124. In this way, the comparator will be provided with a signal through resistor 132 which drops from a first to a second level at the point where the comparator 124 turns on to relieve the brakes.

A diode 170 is connected between the source of positive potential at conductor 102 and ground determined by a pair of resistors 172, 174 which provide a voltage divider and thus insure that the current being fed to the input of comparator 124 does not drop below a certain level corresponding to a low wheel speed. Thus, the low speed cut-off feature for the circuit is provided whereby the circuit will not respond to wheel speed below a preselected amount, as for example 3 miles an hour.

Further, the circuit includes certain elements, for example diode 126 and resistor 176, which are provided to temperature-compensate for certain elements used in the ramp generator circuit 26 as is common in circuits of this type. This holds true also for transistor 110, which provides temperature compensation for certain elements required in the ramp generator circuit.

Referring now to the ramp generator circuit 26, the output of voltage divider resistors 106, 108 is fed to the base electrode of an input transistor 180, which transistor 180 includes an emitter electrode connected to a source of 5 volt potential at conductor 182 through a resistor 184 and a collector electrode connected to ground through a conductor 186. The transistor 180 conducts in accordance with the percentage of wheel speed signal being fed thereto by the voltage divider circuit including resistors 106, 108. The emitter electrode of transistor 180 is connected to a ramp generator capacitor 188 through a diode 190, the voltage on the capacitor 188 being generated in accordance with the initial charge created on the ramp when the wheel speed is generally synchronous with the vehicle speed and a preselected discharge rate for the capacitor 188. The capacitor 188 is discharged in accordance with the conductive condition of a transistor 192, the transistor 192 including a collector-emitter circuit connected to the upper end of the capacitor 188 through a conductor 194 and ground potential connected to the emitter electrode through a resistor 196. The conduction of transistor 192 is controlled by means of a voltage divider circuit which includes a plurality of resistors 198, 200, 202 and 204.

Thus, the voltage at a node 206 rises as the wheel speed rises to increase the charge on the capacitor 188 as the wheel speed increases. When the wheel speed drops off at a greater rate then the charge on capacitor 188 can discharge through the collector emitter circuit of transistor 192, the capacitor 188 will be effectively disconnected from the node 206 due to the back biasing of diode 190. This will permit the discharge of capacitor 188 at a rate determined by the conductive condition of the collector emitter circuit of transistor 192. This ramp signal generated across capacitor 188 due to the charge thereon is fed to the input circuit of the comparator 124 through a resistor 138. Thus, the comparator 124 compares the wheel speed signal with a hypothetical vehicle speed signal generated across the capacitor 188.

The transistor 180 is provided to protect the amplifier driver transistor 100 due to the fact that the wheel signal cannot be shorted out by a transistor 220 if the wheel signal is derived directly from the resistors 106, 108. The transistor 220 is connected to the output circuit, particularly collector-electrode, of transistor 140 to short out the wheel signal in response to the generation of a brake release signal. Transistor 220 is provided to short out input wheel speed signal until comparator 124 turns off. The transistor 220 also performs the function of precluding the floating of the ramp capacitor 188 during acceleration. During acceleration, the capacitor tries to charge due to the low $V_f$ of diode 190 in the unloaded condition.

A transistor 224 and a second transistor 226 have been provided to control the discharge of the capacitor 188 when the output module is turned on. It will be noted that the collector electrode of transistor 224 is connected to a node between resistors 198 and 200 and the emitter electrode of transistor 224 is connected to ground potential through the resistor 196. Thus, the conduction of transistor 192 is either controlled by the current flow through resistors 198, 200, 202, 204 or by a circuit including resistor 198, transistor 224 and resistor 196. The conduction of transistor 224 is controlled by transistor 226 which has its base electrode connected to the output of transistor 152 through a conductor 228 and a resistor 230.

A normally conductive transistor 226 is connected in controlled relation with the charging circuit of a capacitor 227, the charging circuit including resistor 229 connected to the source of 5 volt potential at conductor 182. The charge on capacitor 227 will control the normally non-conductive transistor 224, the transistor 224 being connected in controlling relation with the base emitter bias circuit of transistor 192, including the resistors 198 to 204.

The transistor 224 is connected between the junction of resistors 198 and 200 and, when conductive, will short that junction to the emitter of transistor 192. With this shorting action, the base of transistor 192 is reverse biased to shut off the conduction of transistor 192 and thus prevent any further bleeding of the ramp capacitor 188 after the capacitor 227 has charged up sufficiently to turn transistor 224 on.

Thus, when the module turns on, transistor 226 turns off to start the charging of capacitor 227. When the charge on capacitor 227 reaches the voltage at which transistor 224 will turn on, the junction between resistors 198 and 200 will be shorted to the base of transistor 192. The effect is regenerative in that when the junction between resistors 198 and 200 starts to be shorted to the emitter electrode of transistor 192, the voltage at the upper end of resistor 196 beings to drop. With this condition, the circuit acts as a latch as transistor 224 clamps on and transistor 192 clamps off to establish a flat in the bleed curve of capacitor 188.

It will be noted that the transistor 240 is effectively monitoring the base voltage at transistor 192 through the circuit including the connection to the base electrode and resistor 202, the resistor 202 being connected to the collector electrode of transistor 240. When the transistor 240 is turned on, the resistor 204 is shorted to ground and the voltage divider between the positive 5 volt potential at conductor 182 and ground is comprised mainly of resistors 198 and 202. In this way the conductive condition of transistor 192 is controlled when the module is off. For a further description of this circuit, reference is made to copending application of Robert B. Bertolasi, Ser. No. 218,362, filed Jan. 17, 1972, now abandoned, the description of which is incorporated herein by reference.

Figure 4:
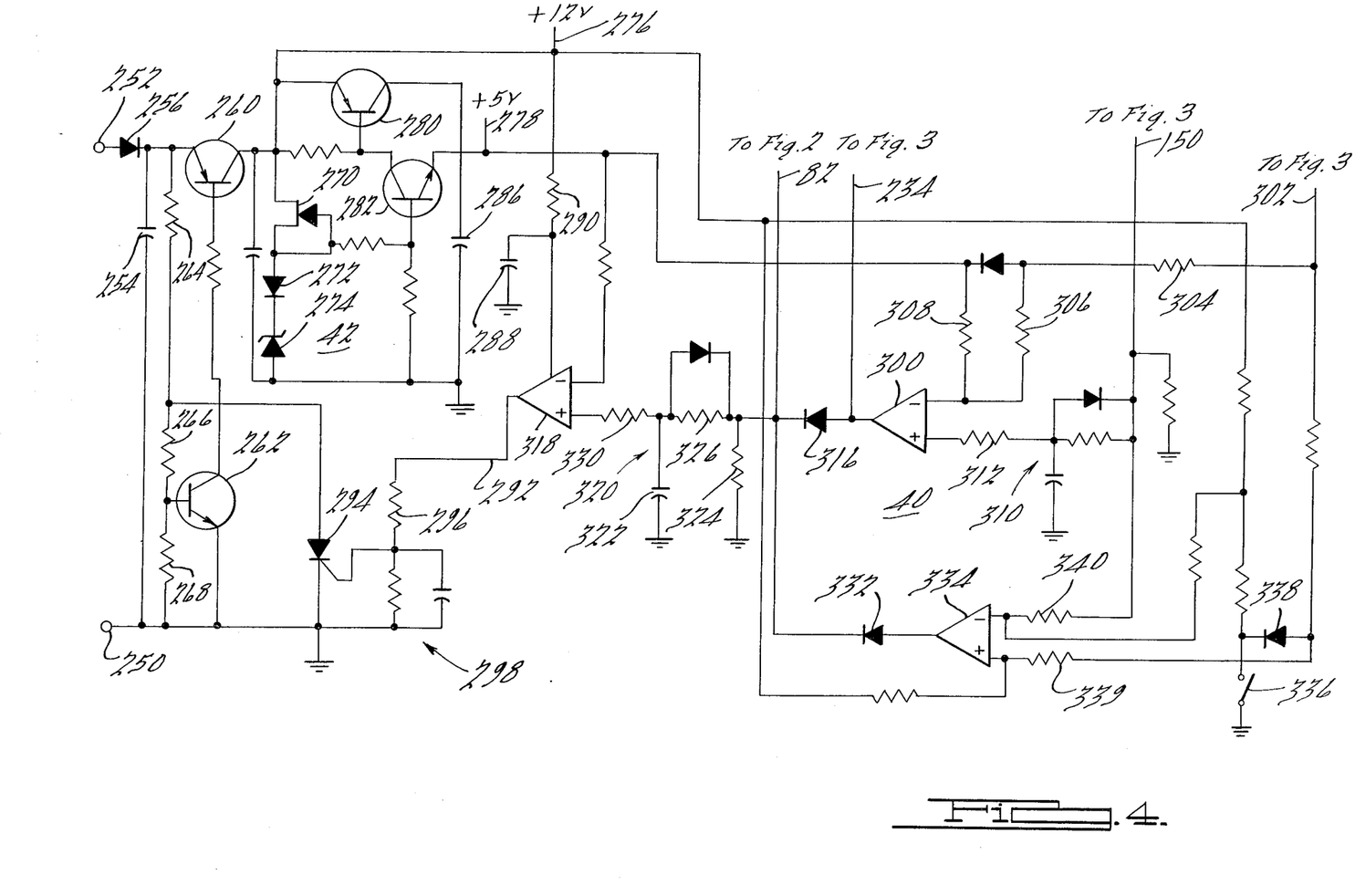
FIG. 4 is a schematic diagram illustrating the remainder of the block diagram of FIG. 1 and particularly illustrating the fail-safe circuits and power supply.

In the event a fault is detected by the fault circuit of FIG. 4, a signal is fed to the ramp generator circuit by means of a conductor 234 and a resistor 236 to a transistor 238 connected in shunt across the capacitor 188. Accordingly, if a fault is detected, a signal is fed to conductor 234 which will cause normally non-conductive transistor 238 to become conductive and to dump the charge on capacitor 188. The operation of FIG. 4 will be more fully described hereinafter.

A transistor 240 is provided in shunt with resistor 204 to shunt the resistor 204 to ground in response to the actuation of the module. The transistor 240 being connected to respond identically to transistor 226, the transistor 240 being connected to conductor 228 through a resistor 242 and a conductor 244.

In the circuit described above, the temperature compensation for diode 190 is provided by diode 126 and the temperature compensation for capacitor 188 is provided by resistor 174, likewise temperature compensation for transistor 180 is provided by transistor 110. It will be noted that other circuit elements in circuit 22 are provided to compensate for elements in circuit 26. Within the ramp generator circuit 26, the diode connected to the base of transistor 192 temperature compensates for the transistor 192.

Referring now to FIG. 4, there is illustrated the circuit details of the power supply circuit 42 and the fail-safe check circuits 40. As stated above, the fail-safe circuits 40 senses the various operations of the circuits described in conjunction with FIGS. 2 and 3, and, if a failure occurs, causes a shut down of the power supply to avoid a malfunction in the operation of the skid control module.

Specifically, the raw unfiltered power is supplied to a pair of input terminals 250, 252 which power is filtered by means of a capacitor 254 and rectified by means of a diode 256. The power is controlled by means of a pair of transistors 260, 262, the transistor 262 forming a driver transistor for the main regulator transistor 260. Both transistors 260 and 262 are normally conductive and the base bias for the transistor 262 is provided by means of resistors 264, 266, 268. The conduction of transistor 262 controls the conduction of transistor 260. The output of transistor 260 is fed to a voltage regulator circuit which includes a field effect transistor 270, a diode 272 and a zener diode 274 connected in series circuit therewith. The transistor 270 is connected in shunt with the output terminal for the twelve volt power supply at conductor 276 and the five volt supply at a conductor 278 is controlled by a pair of series regulator transistors 280, 282. The power supply is filtered by means of capacitors 286, 288 and a resistor 290.

As stated above, the fail-safe check circuit 40 senses the operation of the various portions of the system and provides an output signal which effectively shuts down the power supply. This is accomplished by means of an output signal generated on a conductor 292, which signal supplies a firing voltage for a crowbar connected, controlled rectifier 294 through a resistor 296 and a resistive-capacitive circuit 298. When a fault signal is generated on conductor 292, the controlled rectifier 294 is caused to conduct which effectively shunts the base supply for the transistor 262 to thereby shut the transistor 262 off. The nonconduction of transistor 262 will cause transistor 260 to cease conduction and thereby eliminate the supply of voltage to conductors 276, 278. This effectively shuts down the entire skid control module.

Referring now to the various safety checks, it is seen that the system includes an operational amplifier 300 which is connected as a comparator, the amplifier including an input to the negative side thereof from a conductor 302 which is connected to the output terminal of the module. This output terminal signals when the module has produced an output pulse to control the valve. This output pulse is fed through a resistor 304 and a pair of resistors 306, 308 to the negative input of the amplifier 300. On the other hand, the positive input to the amplifier 300 includes an input from the conductor 150, which input is fed through a resistor diode and shunt capacitor combination 310 and a resistor 312 to the positive input terminal of the amplifier 300, the resistor-capacitor portion of the combination is used to time the duration of the module signal before the modulator comes on. If this time becomes excessive, the amplifier 300 comes on to generate a failure signal. This signal on the conductor 150 is connected to the output terminal of the transistor 140 which indicates that an output pulse should be impressed on the module output terminal 160. If a pulse is signalled by a signal on conductor 150 and a pulse is not present on the conductor 302, the operational amplifier 300 will provide an output signal to indicate a failure. The output signal is fed to the conductor 234 which, in turn, causes transistor 238 to conduct thereby short-circuiting the capacitor 188 and discharging the capacitor 188 very rapidly.

The output of operational amplifier 300 is also fed through an "or" gate diode 316 to the positive input circuit of an operational amplifier 318. This output signal from amplifier 300 is fed through an RC timing network 320 which includes a capacitor 322, a resistor 324 and a second resistor 326. This network 320 is utilized to control the number of times that the operational amplifier 300 detects a failure. If the number of times is excessive, the capacitor 322 will be charged to a sufficient level to feed a signal through a resistor 330 and trigger the operational amplifier 318.

The positive input circuit of the operational amplifier 318 also includes an input signal from conductor 82 through the diode 84 discussed in conjunction with FIG. 2. It is to be noted that the diode 84 and diode 316 form, with another diode to be discussed, an "or" gate such than an input signal from any one of the three circuits will trigger the operational amplifier 318. The signal on conductor 82 is indicative of the fact that a sensor failure has been detected. In this case, either the tachometer sensor has experienced a short circuit or an open circuit as discussed in conjunction with FIG. 2. If such a failure is experienced, a signal will be fed to conductor 82 which will trigger operational amplifier 381 thereby causing crowbar silicon controlled rectifier 294 to conduct.

The third diode forming the "or" gate is diode 332 which is connected to the output of an operational amplifier 334. The operational amplifier 334 includes an input from a modulator switch 336, which switch is closed when the modulator is activated. This modulator is activated when a valve output signal is generated on terminals 160, 162 as discussed in conjunction with FIG. 3. Thus, the switch 336 senses when the modulator has been actuated in response to an output signal from the skid control module. This signal is fed through diode 338.

The operational amplifier 334 also includes an input from conductor 150 through a resistor 340 which indicates that the skid control module has signalled that an output has been generated within the module. This signal is derived from the operation of transistor 140. Thus, operational amplifier 334 senses that a signal has been generated from the skid control module to actuate the modulator. This signal is compared with the operation of the modulator, through switch 336, and signals a fault when the situation exists that a signal is generated from the skid control module and the modulator has failed to respond. As noted above, this output signal is fed through the diode 332 to the input circuit of the operational amplifier 318. This signal, in turn, triggers operational amplifier 318 to cause controlled rectifier 294 to conduct.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination in a skid control system for use in connection with controlling the braking action of at least one wheel of a vehicle, a wheel speed sensor for sensing the rotational speed of the wheel, a wheel speed signal generator connected to the wheel speed sensor for generating a signal representative of the rotational speed of the wheel, a vehicle speed signal generator for generating a signal representative of the vehicle speed, comparator circuit means connected to the wheel speed signal generator and the vehicle speed signal generator for generating an output signal when said wheel speed and said vehicle speed achieve a preselected relationship, output circuit means for generating an output signal to control the vehicle brakes, a power supply connected to said wheel speed signal generator, vehicle speed generator and comparator circuit means for supplying electrical energy to said circuits, and sensor failure circuit means for sensing the open or shorted condition of said wheel speed sensor including means associated with said power supply for shutting down said power supply in response to a fault of the sensed generation of an output signal from said comparator circuit means and the absence of a correlative output signal from said output circuit means for controlling the vehicle brakes, and in response to a fault of sensing said open or shorted condition of said wheel speed sensor, and automatically resetting said power supply in the absence of said faults.

2. In combination in a skid control system for use in connection with controlling the braking action of at least one wheel of a vehicle, a wheel speed sensor for sensing the rotational speed of the wheel, a wheel speed signal generator connected to the wheel speed sensor for generating a signal representative of the rotational speed of the wheel, a vehicle speed signal generator for generating a signal representative of the vehicle speed, comparator circuit means connected to the wheel speed signal generator and the vehicle speed signal generator for generating an output signal when said wheel speed and said vehicle speed achieve a preselected relationship, output circuit means for generating an output signal to control the vehicle brakes, a power supply connected to said wheel speed signal generator, vehicle speed generator, and comparator circuit means for supplying electrical energy to said circuits, and sensor failure circuit means for sensing the open or shorted condition of said wheel speed sensor including means associated with said power supply for shutting down said power supply in response to a sensed sensor failure, said sensor failure circuit including detector means connected across said sensor such that the failure of said sensor in said open or short condition generates a signal to indicate said sensor failure, said sensor failure circuit means further including circuit means connected to said detector means wherein the sensor which has not failed generates a current in both of the conductors connected across the sensor, said circuit means requiring both currents to maintain a conductive condition indicative of the lack of a failure.

3. The combination of claim 2 wherein said shorted condition ceases current condition in both said conductors.

4. The combination of claim 3 wherein said sensor failure circuit means includes an integrated circuit connected to said power supply, said integrated circuit triggering to shut down said power supply in response to said sensed failure.

5. The combination of claim 4 wherein said sensor failure circuit means includes means connected to said vehicle speed signal generator, said connecting means disabling said vehicle speed generator in response to said sensed failure.

6. In combination in a skid control system for use in connection with controlling the braking action of at least one wheel of a vehicle, a wheel speed sensor for sensing the rotational speed of the wheel, a wheel speed signal generator connected to the wheel speed sensor for generating a signal representative of the rotational speed of the wheel, a vehicle speed signal generator for generating a signal representative of the vehicle speed, comparator circuit means connected to the wheel speed signal generator and the vehicle speed signal generator for generating an output signal when said wheel speed and said vehicle speed achieve a preselected relationship, a module including output circuit means for generating an output signal to control the vehicle brakes, a power supply connected to said wheel speed signal generator, vehicle speed generator and comparator circuit means for supplying electrical energy to said circuits, and failure detector circuit means for sensing the output of said comparator circuit and the output of said output circuit, including means connected to said comparator output for timing the duration of said output signal from said comparator, said detector circuit generating an output to shut down said power supply when said comparator circuit provides an output signal for an excessive period of time, said detector circuit means including a detector compactor circuit, said detector compactor circuit being connected to sense both said output signals, said detector compactor circuit generating an output signal to shut down said power supply when said compactor outputs exist and said output circuit output does not exist, said detector compactor circuit being an integrated circuit and said failure circuit means further including means connected to said power supply for shutting down said power supply in response to a preselected number of sensed failures by said detector compactor circuit, said detector circuit including a comparator circuit, said comparator circuit being connected to sense both said output signals, said detector comparator generating an output signal to shut down said power supply when said comparator outputs exist and said output circuit output does not exist, said detector comparator being an integrated circuit and said failure circuit further including means connected to said power supply for shutting down said power supply in response to a preselected number of sensed failures by said detector comparator.

7. In combination in a skid control system for use in connection with controlling the braking action of at least one wheel of a vehicle, a wheel speed sensor for sensing the rotational speed of the wheel, a wheel speed signal generator connected to the wheel speed sensor for generating a signal representative of the rotational speed of the wheel, a vehicle speed signal generator for generating a signal representative of the vehicle speed, comparator circuit means connected to the wheel speed signal generator and the vehicle speed signal generator for generating an output signal when said wheel speed and said vehicle speed achieve a preselected relationship, output circuit means for generating an output signal to control the vehicle brakes, a power supply connected to wheel speed signal generator, vehicle speed generator and comparator circuit means for supplying electrical energy to said circuits, and sensor failure circuit means for sensing the open or shorted condition of said wheel speed sensor including means associated with said power supply for shutting down and resetting said power supply in response to a predetermined combination of electrical conditions of said comparator circuit means output, output circuit means output, power supply and said sensed sensor failure and resetting said power supply shut down, said sensor failure circuit including means connected across said sensor such that the failure of said sensor in said open or short condition generates a signal to indicate said sensor failure in the presence of a substantially zero wheel speed.

8. The combination of claim 7 wherein said sensor failure circuit means further includes circuit means connected to said detector means wherein the sensor which has not failed generates a current in both of the conductors connected across the sensor, said circuit means requiring both currents to maintain a conductive condition indicative of the lack of a failure.

9. The combination of claim 8 wherein said shorted condition ceased current condition in both said conductors.

10. The combination of claim 9 wherein said sensor failure circuit means includes an integrated circuit connected to said power supply, said integrated circuit triggering to shut down said power supply in response to said sensed failure.

11. The combination of claim 10 wherein said sensor failure circuit means includes means connected to said vehicle speed signal generator, said connecting means disabling said vehicle speed generator in response to said sensed failure.

\* \* \* \* \*

UNITED STATES PATENT AND TRADEMARK OFFICE
CERTIFICATE OF CORRECTION

PATENT NO. : 3,944,288

DATED : March 16, 1976

INVENTOR(S) : Robert B. Bertolasi

It is certified that error appears in the above-identified patent and that said Letters Patent are hereby corrected as shown below:

Column 3, line 26, "utlizied" should be --utilized--. Column 4, line 24, "65" should be --56--. Column 6, line 1, "didoe" should be --diode--. Column 8, line 38, "beings" should be --begins--. Column 8, line 68, "being" should be --is--. Column 10, line 14, "The" should be --This--. Column 10, line 43, "381" should be --318--.

Signed and Sealed this

Thirteenth Day of July 1976

[SEAL]

Attest:

RUTH C. MASON
*Attesting Officer*

C. MARSHALL DANN
*Commissioner of Patents and Trademarks*